June 25, 1957
H. J. HERSEY, JR
2,796,950
FILTER
Filed April 11, 1955
2 Sheets—Sheet 1
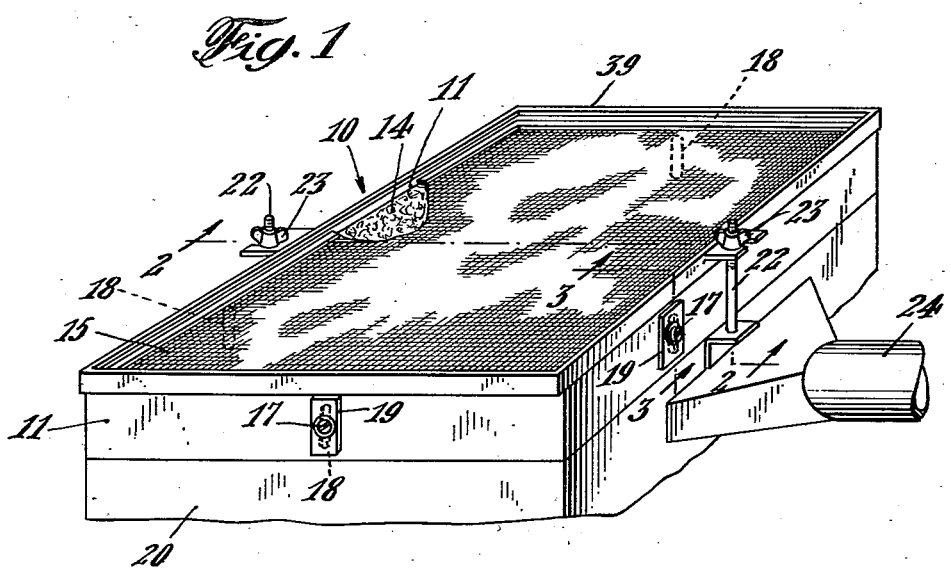
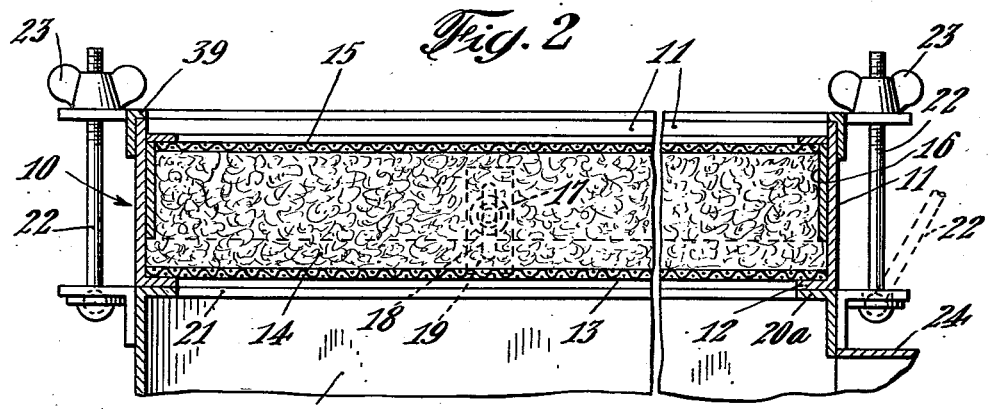
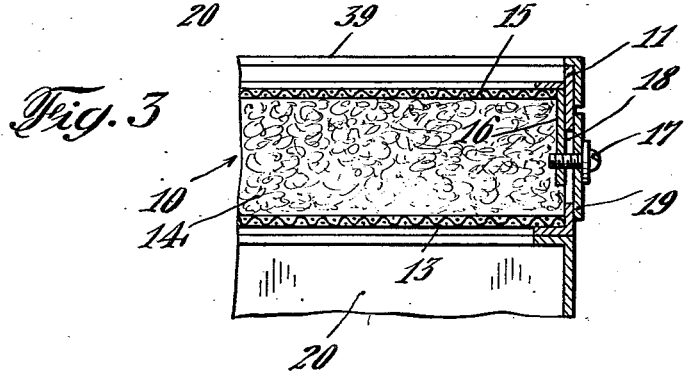

June 25, 1957 H. J. HERSEY, JR 2,796,950
FILTER
Filed April 11, 1955 2 Sheets-Sheet 2

United States Patent Office 2,796,950
Patented June 25, 1957

2,796,950

FILTER

Henry Johnson Hersey, Jr., Chatham, N. J.

Application April 11, 1955, Serial No. 500,341

7 Claims. (Cl. 183—47)

This invention relates to apparatus for removing particles from gases in which they are entrained and more particularly to such apparatus commonly designated as dust filters utilized to remove dust from air to purify the same as well as such apparatus utilized in the recovery or removal of fine particles suspended or entrained in a gaseous atmosphere.

Utilization of loose filter material as distinguished from filter bags or panels made up of compacted or woven filter material provides substantial and important advantages in a dust filter. However, it has proven to be extremely difficult and often impossible to maintain such loose filter material at that porosity which provides maximum filtering efficiency without shutting down the unit for the express purpose of reconditioning the filter material or removing it from the gas stream with resulting complications.

It is, therefore, an object of this invention to provide a filter unit especially suitable for utilizing loose material as the filter medium during operation of which the filter material is maintained at a porosity suitable for optimum filtering efficiency.

Another object is to provide such apparatus in which loose filter material is continuously maintained within a desired range of porosity during operation of the apparatus substantially without adversely disturbing the distribution of the filter material or causing the formation of gaps therein.

A further object of this invention is to provide such a filter unit in which a uniform counterflow of clean gas or air is substantially simultaneously applied to the entire downstream side of the filter element for maintaining the porosity of the filter element within a desired range.

In accordance with this invention gas or air laden with particles is led under pressure to the upstream side of the filter material. Due to the pressure drop thereacross, the gas passes through the filter material and is led away or allowed to pass into the surrounding atmosphere. Periodically or at desired intervals a counterflow of cleaning or reconditioning air is provided in the form of a stream having, in the direction parallel to the surface of the filter material exposed thereto, a cross sectional area substantially equal to the area of said surface. Due to the simultaneous application of the counterflow to the entire downstream surface of the filter material, the material even though comprised of loosely commingled or loosely retained elements is not adversely disturbed or redistributed by the counterflow. In particular, erosion of the filter material and the formation of gaps are avoided. Further advantages are attained by forming the counterflow stream in such manner that the stream has substantially uniform velocity thereacross at least just before it reaches the filter material.

In one embodiment of this invention, loose filter material is arranged in a tray-like container between two perforated or foraminous members. The spacing between the perforated members determines the cross sectional thickness of the filter material which, though it may be relatively thick, is small compared to the surface area of either perforated member. The container may be supported over a closed collector in the form of a hopper for accumulating the filtered particles, the gas to be filtered being led into the collector under pressure and below the filter material container. On the downstream side of the filter material there is provided means for periodically counterflowing the filter material. The counterflow means may include a piston having a configuration and cross sectional area corresponding to that of the filter material container and mounted for reciprocation in a tubular member of like configuration. When driven toward the filter material, the piston causes a counterflow of cleaning air to pass through the filter material from the downstream to the upstream side thereof. In order to minimize interference with the filtering operation by the counterflow, a plurality of discrete filter material container and piston assemblies are utilized, the pistons being operated in desired sequence.

In another embodiment a bellows is mounted on the filter material container and has a configuration and cross sectional area corresponding thereto.

Further objects as well as advantages of the present invention will be apparent from the following description thereof and the accompanying drawings in which Figure 1 is a perspective view of the portion of the filter unit suitable for containing loose filter material;

Figure 2 is a sectional view through the line 2—2 of Figure 1;

Figure 3 is a fragmentary sectional view taken along the line 3—3 of Figure 1;

Figure 4:
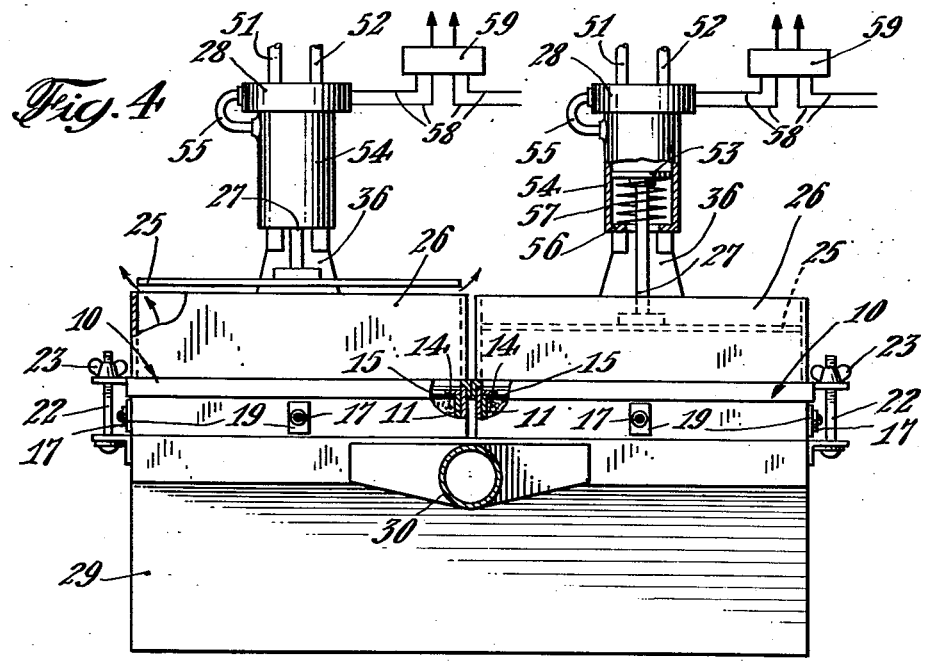
Figure 4 is a side elevational view of a filter unit constructed in accordance with the present invention and including two filter medium assemblies.

By loose filter material it is intended to include such material which is made up of free fibers or particles as distinguished from woven and compacted materials or the like. When such loose fibers have kinks or curls they may become mutually interengaged to a certain extent but their distribution is readily disturbed especially when portions of the filter material are subjected to or acted upon by unequal forces. While the depth of the material may vary with, among other things, the nature of the filter material utilized, and the material to be filtered, depths ranging from about one-half an inch to about three inches have given satisfactory results. Loose filter material may be formed from a wide variety of materials in the form of bulk fibers or granules and includes such materials as glass, asbestos, rock-wool, aluminum oxide fiber, and silica fibers which are especially suitable for use at elevated temperatures. Where the temperatures encountered are relatively low such materials as synthetic fibers, wool, or animal hair may be used.

Referring now to the drawings in detail, container 10 comprises a frame member 11 which forms the walls of container 10 and has a short inwardly extending flange 12. A foraminous sheet-like member 13 formed from suitable screening or perforated sheet material is supported about its periphery by flange 12 and serves as a support for filter material 14. A second foraminous member 15 extends over filter material 14 and is connected to frame member 11. The connection between foraminous member 15 and frame member 11 may be advantageously effected by providing foraminous member 15 with a rim portion 16 extending parallel with frame member 11 and adapted to be engaged by bolts 17. Elongated, vertically disposed slots 18 are formed in frame member 11 so as to permit limited vertical displacement of rim 16 and foraminous member 15 relative to foraminous member 13 when bolts 17 are partially unscrewed. Elongated members 19 in the form of rectangular washers having holes formed therein for the passage of bolts 17 are provided to close off the open portions of slots 18 thereby to prevent the escape of gas therethrough. With foraminous member 15 removed from container 10, loose filter material 14 is evenly distributed over foraminous member 13 to the desired depth and then foraminous member 1 is replaced in the container. Bolts 157 are inserted through slots 18 in frame member 11 so as to engage in rim 16, foraminous member 15 being positioned so as to retain filter material 14 loosely and without unduly compacting the same before bolts 18 are tightened to fix the location of member 15. Adjustment of the spacing between foraminous members 13 and 15 makes it possible to vary the density of the filter material to a limited extent by more or less compressing the filter material between the foraminous members to adapt a specific filter material to the material being filtered. However, it is to be noted that the filter material is loosely retained between members 13 and 15 so as to avoid an excessive pressure drop across the filter.

A collector 20 has an upwardly presented opening 21 bounded by a rim 20a which serves as a seat for container 10. Swivel bolts 22 connected to collector 20 together with wing nuts 23 serve to rigidly secure container 10 upon collector 20 when engaged with retainer 39 extending about the upwardly presented periphery of frame member 11. Collector 20 may have any suitable form and usually includes a pan or conveyor for removing the collected particles therefrom. The gas from which it is desired to remove entrained particles may be led under pressure into collector 20 below container 10 by means of an inlet conduit 24. Due to the closed construction of collector 20 the gas passes upwardly through the filter material in container 10. When such a unit is first put into operation the filter material is clean and provides minimum resistance to the passage of the gas therethrough. As operation of the unit continues the particles removed from the gas adhere to the filter material and lodge in the interstices between the loose fibers or granules of the filter medium. Particularly in connection with the filtering of exceedingly small particles, the filter medium does not attain its optimum retention efficiency until it has been in operation for some time. However, as the operation continues the porosity of the filter material continually decreases and ultimately reaches such a low value represented by an excessive pressure drop across the filter unit as to be unsatisfactory.

It is highly desirable not only to avoid shutting down the filter unit in order to recondition the filter medium, but also to accomplish the reconditioning without overcleaning. In the event the filter material is cleaned to such an extent as to restore it substantially to a like new condition, then the filter operation will once again be inefficient, particularly with respect to trapping fine particles until the retention efficiency of the filter medium has once again been restored to within the optimum range. When reconditioning the filter material it is essential that disarrangement of the loose material which would result in uneven distribution thereof be avoided. It is also essential that the reconditioning be carried out without causing the formation of gaps or thin areas as results when a local jet of cleaning air is scanned over the downstream surface of such filter material.

To effect the desired reconditioning of the filter material so as to maintain its porosity in the desired range, means are provided for forming a counterflow of air having a cross sectional area normal to the direction of flow substantially equal to the entire downstream surface area of the filter material. This is effected by a piston 25 having a surface area substantially equal to the exposed surface of the filter material and mounted for reciprocation in tubular member 26 supported on container 10 in registration with foraminous member 15. Piston rod 27 is displaceable to a limited extent under the influence of fluid pressure controlled by valve 28, the latter being connected to a source of fluid, such as air, under pressure by conduit 51 and to exhaust by conduit 52. As shown, the upper end of rod 27 carries a piston 53 slidable in cylinder 54. Conduit 55 serves to couple the interior of cylinder 54 with valve 28 alternative positions of which serve to connect cylinder 54 to the pressure fluid source and exhaust, respectively. The lower end of cylinder 54 is substantially open to the atmosphere whereby to facilitate sudden and rapid displacement, under the influence of the pressure, of piston rod 27. Inwardly turned lip 56 extending about the open end of cylinder 54 serves to retain relatively weak spring 57 which, while capable of returning piston 25 to its raised position when conduit 55 is coupled to exhaust through valve 28, does not interfere with the desired rapid and forceful down stroke of piston 25.

Figure 6:
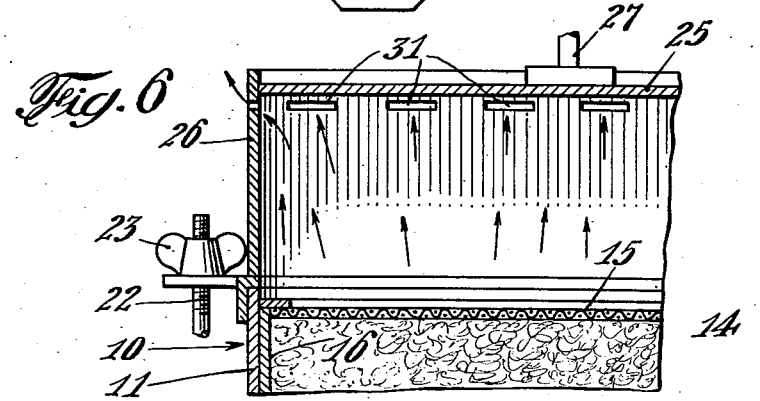
Figure 6 is a fragmentary cross sectional view of a further modification.

In Figure 4 two containers 10 are shown mounted on a common collector 29 similar to collector 20 and provided with an inlet conduit 30. As shown, an individual piston 25 is provided for each of the containers 10 and in its raised position is withdrawn a sufficient distance from tubular member 26 to provide for egress of the cleaned gas during normal operation. As shown in Figure 6, tubular member 26 adjacent to its upper end may be provided with openings 31 through which the cleaned gas may normally pass, piston 25 being raised above openings 31 though not withdrawn from tubular member 26 when at rest.

When piston 25 is driven downwardly, it enters tubular member 26 as shown in Figure 4 or passes openings 31 as in Figure 6. As piston 25 continues downward it causes a counterflow of air to be forced through the container 10 associated therewith thereby removing excess particles from filter medium 14 and maintaining the porosity of the filter medium within the desired range. Valves 28 are operated alternately so as to interfere as little as possible with the normal filtering operation. While only two filter element and piston assemblies are shown in Figure 4, it is to be understood that as many as desired may be utilized and preferably a sufficient number thereof is provided so that sequential operation of the counterflow means minimizes interference with normal filter operation.

Valves 28 may be electrically operated as by solenoids connected by means of conductors 58 to a suitable control means 59. Valves 28 may also be mechanically actuated through suitable levers and cams so that the desired sequence of operation is provided.

Figure 5:
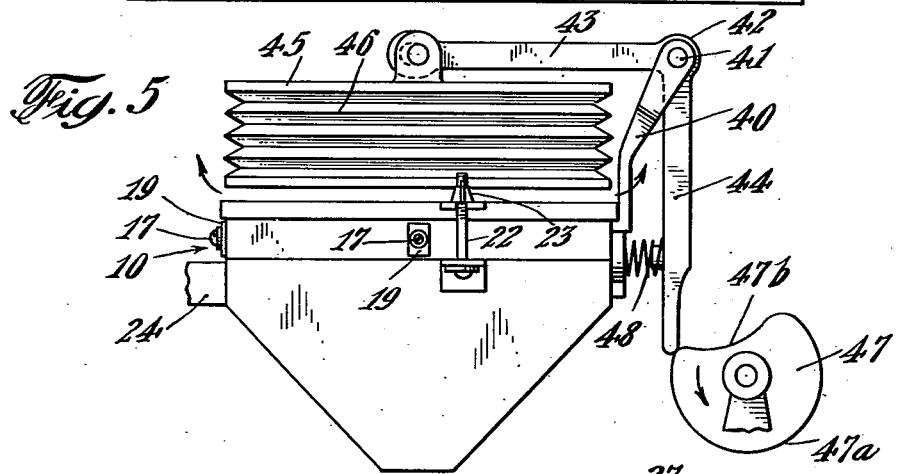
Figure 5 is a front elevational view of another type of filter unit utilizing loose filter material constructed in accordance with the present invention.

In the embodiment of Figure 5, container 10 and dust receptacle 29 are constructed as was previously described. Loose filter material 14, as was indicated in connection with Figures 1-4, serves to remove particles entrained in the gas admitted into receptacle 29 through inlet conduit 24 on the upstream side of container 10. Support member 40 may be suitably supported on container 10 and collector 29 and at its upper extremity is provided with a trunnion 41 on which lever 42 is pivotally mounted. Lever 42 has a work arm 43 connected to end member 45 of bellows 46 and also a power arm 44 engaging at its free extremity cam 47. As shown in Figure 5, power arm 44 is biased by spring 48 toward and into engagement with cam 47 so that the power arm follows the curvature of the peripheral surface of the cam.

In the present instance, cam 47 is provided with a long dwell 47a which, while power arm 44 is in engagement therewith, serves to maintain spring 48 compressed and work arm 43 raised. The axial dimension of bellows 46 is such that with work arm 43 raised the lower, open end of the bellows is removed from container 10 thereby permitting egress of the cleaned gas during normal operation. When cam 47 is rotated so that power arm 44 leaves dwell 47a to engage portion 47b of reduced radius, lever 42 under the influence of spring 48 is rotated counterclockwise, carrying work arm 43 downward. Initial downward movement of arm 43 serves to seat bellows 46 on container 10. Further rotation of lever 42 serves to carry end member 45 downward, collapsing the bellows and causing a counterflow. Due to the presence of spring 48 the movement of lever 42 to collapse bellows 46 is rapid and sudden, and this is substantially independent of the speed at which cam 47 is rotated.

The surface area of end member 45 and the cross sectional area of the counterflow generated by its movement are substantially equal to the downstream surface area of filter material 14. Consequently, even though the counterflow is delivered suddenly and with sufficient pressure to force the cleaning air through the filter material in the reverse direction, no erosion, channeling or other harmful effects on the filter material result.

The arrangement shown in Figure 5 lends itself for use in installations in which two or more, and preferably at least four, filter containers 10 are provided in parallel as was described in connection with Figure 4.

It is to be noted that while the gas to be cleaned is led to the upstream side of the filter material under pressure, this pressure is relatively small and in particular is small compared to the pressure of the counterflow stream. By providing a counterflow stream having a substantially uniform velocity distribution as it approaches the downstream surface of the filter material adverse effects upon the filter material are avoided. In this regard the cross sectional shape of tubular member 26 or bellows 46 is important inasmuch as the walls thereof in effect form a conduit for the counterflow stream, which conduit where it communicates with the downstream surface of the filter material has a shape and cross sectional area substantially congruent with the surface area of the filter material. Consequently, there are no changes in velocity and the formation of undesired turbulence as well as vortexes in the counterflow stream as it approaches the filter material are avoided.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A filter, comprising a porous filter element having an upstream and a downstream side, means supporting said filter element and forming a housing therefor, means for leading a particle laden gas under pressure to the upstream side of said filter element, means on the downstream side of said filter element for forming a counterflow of gas from the downstream side toward the upstream side of said filter element and forming a stream having substantially uniform velocity thereacross and having a cross sectional area transverse to the direction of flow substantially equal to the expanse of the downstream side of said filter material, and said last mentioned means including a conduit communicating directly with the downstream side of said filter element for shaping and guiding said counterflow stream and having a cross sectional shape normal to said stream congruent with the shape of the downstream side of said filter element, a plunger mounted for displacement relative to said conduit having a surface area substantially equal to the expanse of the downstream side of said filter material, and means for displacing said plunger toward said filter element into direct close spaced relation therewith and away from the same.

2. A filter, comprising a pair of foraminous sheet-like members, means supporting said foraminous members horizontally in spaced relation with the distance between said members small compared to the expanse thereof, loose filter material in said space between said foraminous members and loosely retained thereby, one of said foraminous members being disposed downstream of said filter material and the other upstream of said filter material, means for leading a particle laden gas under pressure to the upstream side of said filter material, and means on the downstream side of said filter material for causing a counterflow of gas from the downstream toward the upstream side of said filter material and forming a stream having substantially uniform velocity across the stream and having a cross sectional area transverse to the direction of flow substantially equal to the expense of the downstream side of said filter material, said last mentioned means including a plunger mounted for displacement toward and away from said filter element and means for directing the counterflow formed thereby into said filter element, said plunger having a surface area substantially equal to the expense of the downstream side of said filter material, and means for displacing said plunger toward and into close spaced relation with the downstream side of said filter element and away therefrom.

3. A filter, comprising a pair of foraminous sheet-like members, means supporting said foraminous members horizontally in spaced relation with the distance between said members small compared to the expense thereof, loose filter material in the space between said foraminous members and loosely retained thereby, one of said foraminous members being disposed downstream of said filter material and the other upstream of said filter material, means for leading a particle laden gas under pressure to the upstream side of said filter material, and means on the downsteam side of said filter material for causing a counterflow of gas from the downstream side toward the upstream side of said filter material and forming a stream having a cross sectional area susbtantially equal to the expanse of the downstream side of said filter material, said last mentioned means including a movable plunger member having a surafce area substantially equal to the surface area of the downstream side of said filter material and mounted adjacent thereto, said plunger member being mounted for displacement between two extreme positions, said plunger member in one of said positions being in direct close spaced relation with the downstream side of said filter element, and means for moving said plunger member between said positions toward and away from said filter element.

4. A filter, comprising a pair of foraminous sheet-like members, means supporting said foraminous members in spaced relation, porous filter material in the space between said foraminous members and loosely retained thereby, one of said foraminous members being disposed downstream and the other upstream of said filter material, means for leading a particle laden gas under pressure to the upstream side of said filter material, means on the downstream side of said filter material for causing a counterflow of gas from the downstream side to the upstream side of said filter material and forming a stream having a cross sectional area substantially equal to the expanse of the downstream side of said filter material, said last mentioned means including a conduit and a plunger member movable therealong having a surface area substantially equal to the surface area of the downstream side of said filter material, and said conduit communicating with the downstream side of said filter material, means supporting said plunger member adjacent to said filter element with said plunger member displaceable from a position removed from said filter element to a position in direct close spaced relation thereto, and means for displacing said plunger member between said positions.

5. A filter, comprising a plurality of relatively shallow containers each having a pair of foraminous members supported in spaced relation with the distance between said members small compared to the expanse thereof, porous filter material in the space between said foraminous members with one foraminous member being disposed downstream of said filter material and the other upstream of said filter material, means for leading a particle laden gas under pressure to the upstream side of said filter material, a plurality of tubular members one for each of said containers and supported on the downstream side thereof, said tubular members each having a cross sectional area substantially congruent with that of the container associated therewith, a plurality of pistons one mounted for reciprocation in each of said tubular members and having a face the configuration and surface area of which is substantially congruent with that of the expanse of filter material exposed thereto, and means for sequentially actuating said pistons.

6. A filter, comprising a plurality of tray-like containers each having a frame member, a pair of foraminous members supported by said frame member in spaced relation, porous filter material in the space between said foraminous members with one foraminous member upstream and the other downstream of said filter material, means for adjusting the spacing of one of said foraminous members relative to the other, means for leading a particle laden gas under pressure to the upstream side of said filter material, a plurality of tubular members one for each of said containers and supported on the downstream side thereof, a plurality of pistons one mounted for reciprocation in each of said tubular members and having a face the configuration and surface area of which is substantially congruent with that of the foraminous member toward which it is presented, means for sequentially actuating said pistons thereby sequentially causing a counterflow through the filter material in each of said containers.

7. A filter, comprising a plurality of tray-like containers each having a frame member, a pair of foraminous members supported by said frame member in spaced relation, porous filter material in the space between said foraminous members with one foraminous member upstream and the other downstream of said filter material, means for adjusting the spacing of one of said foraminous members relative to the other, means for leading a particle laden gas under pressure to the upstream side of said filter material, a plurality of bellows one mounted on the downstream side of each of said containers and having a cross sectional area in the direction parallel with said containers substantially equal to the downstream surface area of said filter material, said bellows each having an end member movable toward and away from its respective container, said end members each having a surface area substantially equal to the expanse of the downstream surface of the filter material in the container associated therewith, and means for sequentially actuating each of said end members, whereby sequentially to form a counterflow stream of cleaning gas through the filter material in each of said containers from the downstream to the upstream side thereof with said stream having a cross sectional area transverse to the direction of flow substantially equal to that of the expanse of the downstream side of the filter material.

References Cited in the file of this patent

UNITED STATES PATENTS

| | | |
|---|---|---|
| 1,429,713 | Cazier et al. | Sept. 19, 1922 |
| 1,493,110 | Diehl | May 6, 1924 |
| 2,731,107 | Hersey | Jan. 17, 1956 |